United States Patent [19]
Brandstetter

[11] 3,783,845
[45] Jan. 8, 1974

[54] AIR INDUCTION SYSTEM FOR AN INTERNAL COMBUSTION ENGINE

[75] Inventor: Walter R. Brandstetter, Isenbuttel, Germany

[73] Assignee: General Motors Corporation, Detroit, Mich.

[22] Filed: Dec. 21, 1972

[21] Appl. No.: 317,396

[52] U.S. Cl.......... 123/55 VE, 55/110, 123/52 MV, 123/139 AW
[51] Int. Cl....................... F02b 29/02, F02b 75/22
[58] Field of Search................... 55/110; 123/52 M, 123/52 MV, 55 V, 55 VE, 55 VF, 55 VS, 139 AW

[56] References Cited
UNITED STATES PATENTS

| | | | |
|---|---|---|---|
| 2,382,244 | 8/1945 | Lundquist et al. | 123/52 MV |
| 2,871,842 | 2/1959 | Dolza | 123/52 MV |
| 3,015,322 | 1/1962 | Rohm | 123/52 M |
| 3,520,284 | 7/1970 | Ruoff et al. | 123/52 MV |

*Primary Examiner*—Al Lawrence Smith
*Assistant Examiner*—Tony Argenbright
*Attorney*—J. L. Carpenter et al.

[57] ABSTRACT

An air induction system for an internal combustion engine wherein an elongated, header housing adapted to be positioned between the banks of angularly disposed cylinders of the engine encloses an intake manifold chamber having an elongated throttle valve reciprocably positioned therein to regulate airflow to the engine through a rectangular aperture in the top wall of the housing to passages in the side wall of the housing, the side wall passages corresponding in number and position to the number of cylinders of the engine and the intake manifold chamber having header tubes positioned therein to further provide a uniform airflow from the aperture through the intake manifold chamber and the side wall passages to each of the cylinders of the engine.

4 Claims, 5 Drawing Figures

AIR INDUCTION SYSTEM FOR AN INTERNAL COMBUSTION ENGINE

This invention relates to an air induction system for an internal combustion engine and, particularly, to an air induction system for an internal combustion engine for providing a uniform airflow to each cylinder of the engine.

To provide low emission internal combustion engines, the cylinder to cylinder deviations in the air-fuel mixture should be held to a minimum. With port or cylinder fuel injection, more accurate fuel distribution is feasible to minimize the cylinder to cylinder deviations in the fuel delivered to the cylinders. This invention recognizes that further reduction in the cylinder to cylinder deviation in air-fuel mixture may be obtained by reducing the cylinder to cylinder deviations in the airflow to each cylinder.

It is an object of the present invention to provide an air induction system for an internal combustion engine for minimizing the cylinder to cylinder deviations in the airflow delivered to each cylinder of the engine.

It is another object of the present invention to provide an elongated header housing adapted to be connected to a bank of cylinders of an internal combustion engine and having a operator controlled elongated throttle valve reciprocably positioned in an intake manifold chamber of the housing to regulate airflow therethrough to the cylinders of the engine.

It is another object of the present invention to provide an air induction system of the foregoing type wherein header tubes are positioned in the intake manifold chamber to effect a uniform airflow to each cylinder.

These and other objects of the invention are attained by an air induction system including an elongated header housing extending the longitudinal length of the banks of cylinders of an internal combustion engine and including a top wall, a bottom wall, side walls and end walls forming therebetween an open, large volume intake manifold chamber. The side walls of the housing are adapted to be connected to the cylinder heads of the engine with each of the side walls having a plurality of side wall passages therethrough corresponding in number and position to the number and position of the cylinders in the cylinder head with which it cooperates. The top wall of the housing has a rectangular shaped aperture therethrough extending approximately the full length of the elongated chamber, and a throttle valve is positioned in the intake manifold chamber for reciprocal movement between a closed position and a fully opened position relative to the aperture. Operator controlled cam means are supported by the header housing to control movement of the throttle valve between the closed position and the fully opened position. A plurality of header tubes are positioned in the intake manifold chamber, one end of each header tube being secured to a side wall to encircle a side wall passage and the other end of the tube being positioned in open flow relation to the intake manifold chamber to permit free, uniform airflow from the intake manifold chamber to each of the cylinders of the engine.

For a better understanding of the invention, as well as other objects and further features thereof, reference is had to the following detailed description taken in conjunction with the accompanying drawings, wherein.

Figure 1:
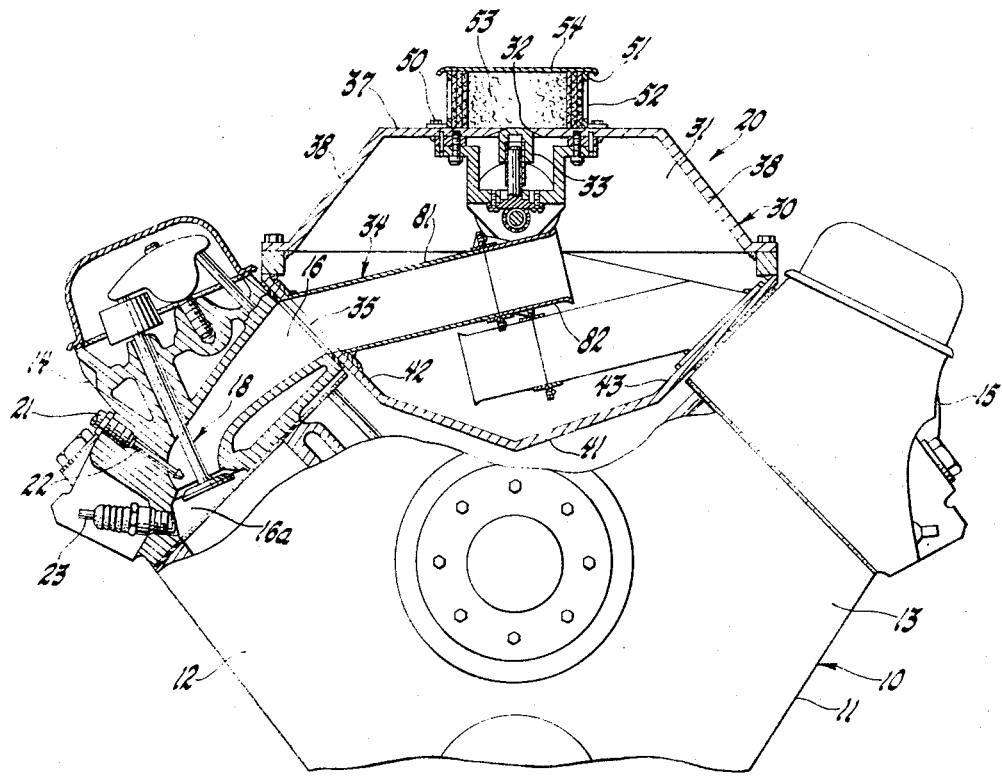
FIG. 1 is a front view with parts in cross section and other parts shown schematically of an internal combustion engine having an air induction system provided in accordance with the present invention.

With reference now to the drawings, and in particular to FIG. 1, there is shown a V-type internal combustion engine 10, which in the embodiment shown is a V-type engine, comprising a cylinder block 11 having an N number of cylinders, the N number in the embodiment shown being eight, with half of the cylinders in the left cylinder bank 12 and the other half in the right cylinder bank 13. Both banks extend along the longitudinal direction of the engine with the cylinders of the left bank 12 being angularly disposed from the cylinders of the right bank 13. Left and right cylinder heads 14 and 15, respectively, are connected to the top of the left and right cylinder banks 12 and 13, respectively, and each has an N/2 number of sets of intake passages 16, flow therethrough being controlled in the conventional manner by a suitable valve mechanism 18. Airflow to the intake passages 16 is through and controlled by an air induction system 20, in accordance with the invention.

Fuel to each of the cylinders of the engine is supplied by a suitable fuel injection system which includes, for each cylinder, a fuel line 21 connected to a fuel injector 22, of a type well known in the art for injecting fuel individually to each cylinder. Each cylinder of the engine 10 is also provided with a distributor-operated spark plug 23 controlled in a conventional manner to ignite the air-fuel mixture admitted into each cylinder.

The air induction system 20 of the present invention comprises an elongated air intake manifold or header housing 30 having walls forming a large open volume intake manifold chamber 31 having an air inlet aperture 32 in a top wall of the housing controlled by an elongated bar-shaped throttle valve 33 actuated by an operator to regulate airflow through header tubes 34 and 34a and discharge ports 35 to the cylinder head intake passages 16.

Figure 2:
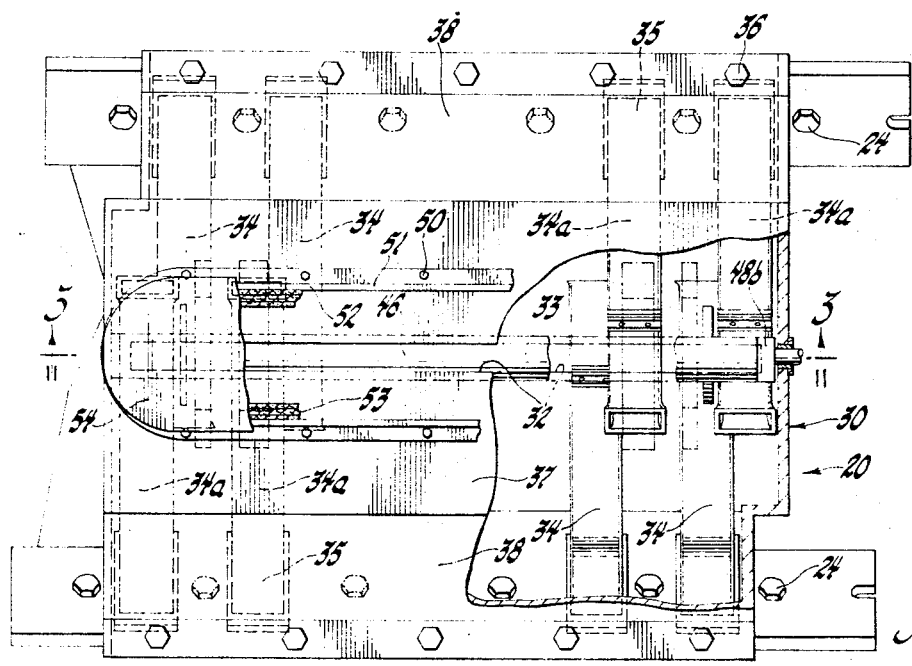
FIG. 2 is a top plan view of the air induction system of FIG. 1 with the top wall of the header housing of this unit partially broken away to show details of elements within the header housing.
Figure 3:
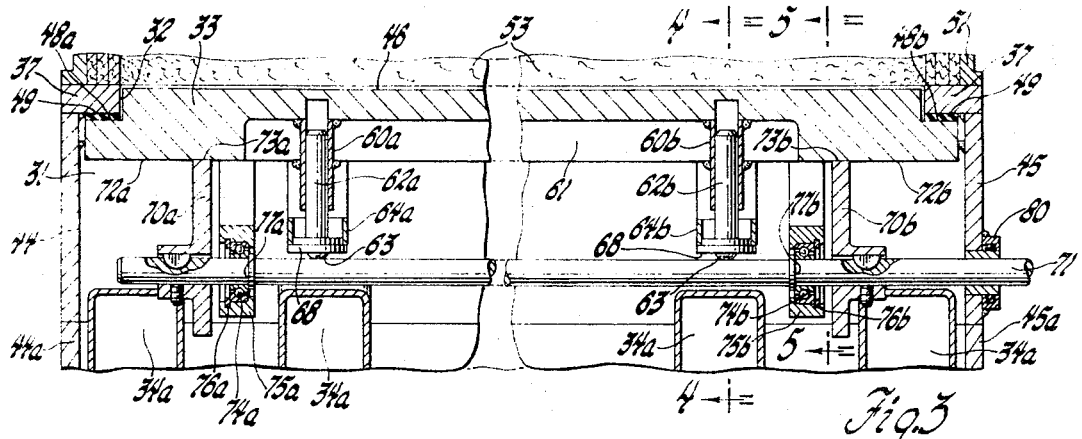
FIG. 3 is a sectional view of the air induction system shown in FIG. 2 taken along line 3—3 thereof.

The box-like, elongated header housing 30 is formed in two sections suitably secured together as by bolts 36 to extend the longitudinal direction of engine 10 and has walls including a top wall having a top flat wall portion 37 and inclined upper walls 38 on opposite sides thereof, a V-shaped bottom wall 41, a left side wall 42 suitably connected as by bolts 24 to the left cylinder head 14, a right side wall 43 suitably connected as by bolts 24 to the right cylinder head 15, front or left end upper wall 44 and lower wall 44a and a rear or right end upper wall 45 and lower wall 45a, with reference to FIGS. 2 and 3, to form the intake manifold chamber 31. Each side wall has an N/2 number of discharge ports 35 therethrough, each discharge port 35 being postioned to communicate with the cylinder head intake passage 16 with which it cooperates.

To permit uniform airflow to each of the header tubes in the intake manifold chamber 31, aperture 32 extends substantially down the full length of the center of the top wall 37, and throttle valve 33 also extends down substantially the full length of intake manifold chamber 31. While other valve and seat arrangements may be used, an arcuate or convex shaped top surface 46 is provided on the top of throttle valve 33 to move relative to a complementing concave shaped valve seat 47 formed on the underside of top wall 37 immediately outboard of aperture 32. Throttle valve 33 terminates at its front and rear ends in stepped flat surfaces 48a and 48b, respectively, and overlaps top wall 37 at the front and rear ends of aperture 32. Each flat surface 48a and 48b carries a sealing pad 49 for sealing against the underside of top wall 37 when throttle valve top surface 46 seats on valve seat 47, sealing pads 49 then serving to prevent admittance of air through the clearances provided between the ends of throttle valve 33 and aperture 32 to normally permit free movement of throttle valve 33 when closing aperture 32.

Suitably mounted on the exterior of top wall 37, as by bolts 50, is an air intake duct 51 having openings 52 in the wall thereof to house an oval-shaped filter element 53, the filter being positioned to encircle the aperture 32 and being secured in duct 51 by a cover plate 54 releasably secured around the outer, upper rim of duct 51.

Figure 4:
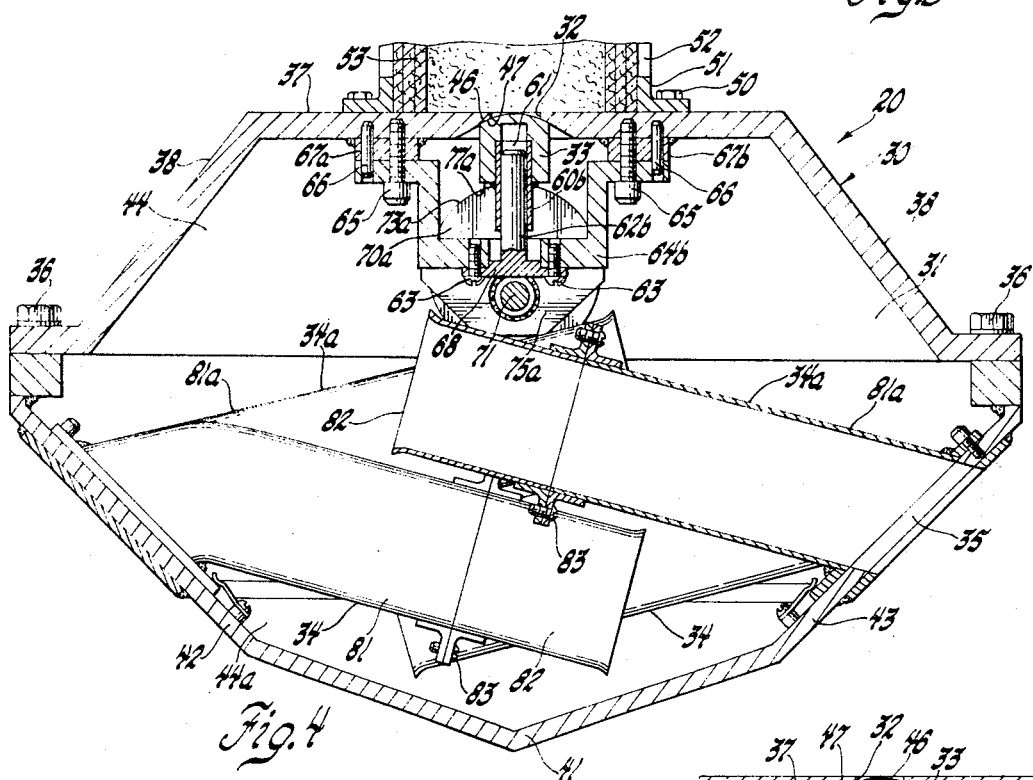
FIG. 4 is a sectional view of the air induction system taken along line 4—4 of FIG. 3 and showing the valve thereof in a closed position; and, FIG. 5 is a sectional view of a portion of the air induction system taken along line 5—5 of FIG. 3 and showing the valve in an open position.
Figure 5:
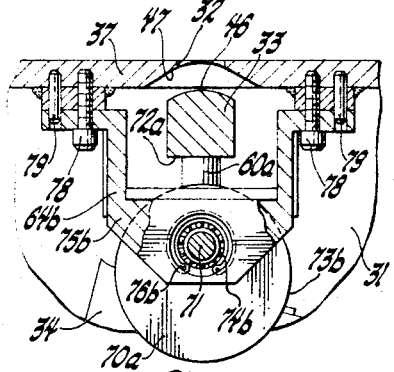

To guide and support the throttle valve 33 between a closed position, seen in FIG. 4, and a full open position, seen in FIG. 5, front and rear guide tubes 60a and 60b, respectively, are secured as by welding in spaced apart relation to each other to the underside or bottom of the throttle valve 33 which has a U-shaped channel opening 61 therein to reduce its weight. Guide tubes 60a and 60b are telescopingly received by front and rear guide pins 62a and 62b, respectively, the enlarged base portions 68 of which are suitably secured by screws 63 to front and rear U-shaped guide pin support brackets 64a and 64b. Guide pin support brackets 64a and 64b are spaced longitudinally within the housing 30 in alignment with aperture 32 and have legs suitably secured and positioned as by screws 65 and dowels 66 to right and left, in reference to FIG. 4, mounting rails 67a and 67b, respectively, welded to the underside of top wall 37, outboard of aperture 32. The legs and bottom of each support bracket 64a and 64b form a channel permitting free reciprocal movement of throttle valve 33, between its closed position and its open position, the closed position being determined by valve top surface 46 when raised to fully seat on valve seat 47 and the open position being determined when the lower end of guide tubes 60a and 60b contact the enlarged base portions 68 of guide pins 62a and 62b.

To effect this reciprocal movement of throttle valve 33, front and rear cam plates 70a and 70b, respectively, are mounted eccentrically on a cam plate shaft 71 extending in the direction of aperture 32 and are rotated thereby to act vertically against the weight of throttle valve 33. Cam plates 70a and 70b are fixed in axially spaced relation along cam plate shaft 71 so as to be aligned under front and rear cam follower surfaces 72a and 72b, respectively, formed on the bottom of throttle valve 33 fore and aft, respectively, of channel 61 therein. The weight of valve member 33 effects engagement with the cam surfaces 73a and 73b, respectively, on the outer peripheries of cam plates 70a and 70b, respectively, and causes valve member 33 to follow the drop permitted by cam plates 70a and 70b until the lower ends of guide tubes 60a and 60b contact the base portions 68 of guide pins 62a and 62b.

Cam plate shaft 71 is rotatably supported by front and rear ball bearings 74a and 74b, respectively, carried by front and rear U-shaped shaft support brackets 75a and 75b, respectively, and are each retained therein by snap rings 76a and 76b, respectively. Stop shoulders 77a and 77b on cam plate shaft 71 abut against the bearing with which it is associated to retain the cam shaft axially within the header housing 30. The shaft support brackets 75a and 75b are spaced longitudinally within the header housing 30 in alignment with aperture 32 and have legs suitably secured and aligned as by screws 78 and dowels 79 to mounting rails 67a and 67b, respectively, the legs and the bottom of each shaft support bracket 75a and 75b forming a channel permitting throttle valve 33 to reciprocate freely between its closed position and its open position. The rear end of cam plate shaft 71 is journalled in a bushing 80 suitably secured as by welding to the upper rear end wall 45 of header housing 30 and is connected by a suitable pedal linkage, not shown, to be rotated under the control of the vehicle operator in a conventional manner.

Positioned in chamber 31 are an N number of header tubes 34 and 34a, the lengths of which are positioned laterally to the length of aperture 32. One end of each header tube 34 and 341 is the discharge end and is secured to either the left side wall 42 or the right side wall 43 to encircle a different discharge port 35 therethrough, and the other end of each header tube 34 and 34a is the intake end and is positioned, as desired, to provide a uniform airflow to each cylinder. The length, position or angle of the header tubes may be varied to effect tuning. With this arrangement, every cylinder will find substantially identical inlet conditions because the individual header tubes 34 and 34a render the airflow to each cylinder independent of the firing order of the engine and because aperture 32 effects a substantially uniform pressure distribution at the intake end of each header tube. The lengths and diameters of the header tubes may be selected to obtain induction ram effects wherein the kinetic eneryg of the column of air moving in the tube is beneficially employed in a known manner to increase the airflow into each cylinder. Moreover, in the embodiment shown, the header tubes 34 and 34a are formed in two parts with a base portion 81 or 81a, respectively, and an extension portion 82 secured by bolts 83 to these base portions so that the overall length of any header tube may be varied as desired to facilitate tuning.

The position and grouping of the discharge ports 35 in the housing side walls is determined by the particular arrangement of the intake ports 16a of each cylinder in the engine cylinder bank. Thus, while other cylinder intake port arrangements may be selected by those skilled in the art, the cylinder intake ports 16a in the embodiment shown are grouped in four pairs, one pair being spaced apart from another along the length of each side wall. To effect such grouping without causing interference between opposing header tubes connected to opposing side walls, the header tubes 34 encircling the right front pair and the left rear pair of discharge ports 35 are provided with base portions 81 inclined downwardly and oppositely from the upwardly inclined pair of header tubes 34a having base portions 81a encircling the left front and the right rear pairs of discharge ports 35.

Having described one embodiment of the present invention, it is understood that the specific terms and examples are employed in a descriptive sense only and not for the purpose of limitation. Other embodiments of the invention, modifications thereof, and alternatives thereto may be used. I therefore aim in the appended claims to cover such modifications and changes as are within the true spirit and scope of my invention.

What I claim as new and desire to secure by Letters Patent of the United States is:

What is claimed is:

1. An air induction system for use with an internal combustion engine having a cylinder block with a pair of angularly disposed banks of cylinders therein, each bank having an N/2 number of cylinders extending in a line longitudinally of the engine and each bank having a cylinder head extending the longitudinal length of a bank of cylinders, each cylinder head having an N/2 number of intake passages therein, each intake passage positioned to correspond with the cylinder with which it cooperates to permit the flow of working fluid thereto, the air induction system including;
   a. an elongated box-like header housing adapted to be connected to the cylinder heads and having a width corresponding to the wdith therebetween, said box-like elongated header housing having walls including a top wall and a first side wall and a second side wall forming a chamber therein, each of said side walls having a N/2 number of side wall passages therethrough in flow relationship to said intake passages, and an elongated, narrow air inlet aperture through said top wall extending approximately the full longitudinal length of said header housing;
   b. an air intake duct connected to said top wall and encircling said elongated narrow aperture;
   c. throttle valve means including an elongated narrow throttle valve positioned within said elongated chamber for reciprocal movement relative to said top wall between a closed position blocking flow through said aperture and an open position permitting flow through said aperture;
   d. operator controlled cam means journalled in said header housing and operatively associated with said throttle valve to effect movement thereof between said open position and said closed position therof; and,
   e. a first group of N/2 number of header tubes and a second group of N/2 number of header tubes positioned within said elongated chamber, one end of each header tube of said first group of header tubes being connected to said first side wall and encircling one of said side wall passages in said first side wall and one end of each header tube of the second said group of header tubes being connected to said second side wall and encircling one of said side wall passages in said second side wall, and the other ends of said header tubes of said first group and of said second group being positioned within said chamber.

2. The air induction system of claim 1 wherein said air inlet aperture is centrally located in said top wall between said first side wall and said second side wall and wherein said operator controlled cam means includes a shaft rotatably positioned by said walls in alignment with said throttle valve and a pair of spaced apart cam plates affixed to said cam shaft, said cam plates each having a peripheral surface for engaging said throttle valve in a sliding contact to effect said reciprocal movement thereof.

3. The air induction system of claim 1 wherein said first group of header tubes and said second group of header tubes are separated into oppositely facing sets of tubes, each tube of the first group of header tubes of a set being oppositely inclined from a corresponding tube of the second group of header tubes of the set so as to prevent interference between the tubes in each set.

4. An air induction system for use with an internal combustion engine having a cylinder block with a pair of angularly disposed banks of cylinders therein, each bank having an N/2 number of cylinders extending in a line longitudinally of the engine and each bank having a cylinder head extending the longitudinal length of a bank of cylinders, each cylinder head having an N/2 number of intake passages therein, each intake passage positioned to correspond with the cylinder with which it cooperates to permit the flow of working fluid thereto, the air induction system including:
   a. an elongated box-like header housing adapted to be connected to the cylinder heads and having a width corresponding to the wdith therebetween, said box-like elongated header housing having walls including a top wall and a first side wall and a second side wall forming a chamber therein, said first side wall and said second side wall each having an N/2 number of side wall passages therethrough in flow relationship to said intake passages, and an elongaged, narrow air inlet aperture through said top wall extending approximately the full longitudinal length of said header housing, said air inlet aperture being centrally located in said top wall between said first side wall and said second side wall;
   b. an air intake duct connected to said top wall and encircling said elongated narrow aperture;
   c. throttle valve means including an elongated narrow throttle valve positioned within said elongated chamber for reciprocal movement relative to said top wall between a closed position blocking flow through said aperture and an open position permitting flow through said aperture;
   d. operator controlled cam means journalled in said header housing and operatively associated with said throttle valve to effect movement thereof between said open position and said closed position thereof, said operator controlled cam means includes a shaft rotatably positioned by said walls in alignment with said throttle valve and a pair of spaced apart cam plates affixed to said cam shaft, said cam plates each having a peripheral surface for engaging said throttle valve in a sliding contact to effect said reciprocal movement thereof; and,
   e. a first group of N/2 number of header tubes and a second group of N/2 number of header tubes positioned within said elongated chamber, one end of each header tube of said frist group of header tubes being connected to said first side wall and encircling one of said side wall passages in said first side wall and one end of each header tube of the second said group of header tubes being connected to said second side wall and encircling one of said side wall passages in said second side wall, and the other ends of said header tubes of said first group and of said second group being positioned within said chamber, adjoining header tubes of said first group of header tubes and of said second group of header tubes being inclined relative to each other.

* * * * *